US007665400B2

(12) United States Patent
Duke

(10) Patent No.: US 7,665,400 B2
(45) Date of Patent: Feb. 23, 2010

(54) PRINT MONITORING SYSTEM AND METHOD

(75) Inventor: Dana Kipland Duke, Jefferson, GA (US)

(73) Assignee: Scientific Games International, Inc., Newark, DE (US)

( * ) Notice: Subject to any disclaimer, the term of this patent is extended or adjusted under 35 U.S.C. 154(b) by 668 days.

(21) Appl. No.: 10/983,960

(22) Filed: Nov. 8, 2004

(65) Prior Publication Data
US 2006/0096482 A1    May 11, 2006

(51) Int. Cl.
*B41F 33/00* (2006.01)
(52) U.S. Cl. .................... 101/481; 101/484; 283/72; 283/903; 382/100
(58) Field of Classification Search ................. 283/903, 283/72; 101/481, 485, 486, 484; 382/112
See application file for complete search history.

(56) References Cited

U.S. PATENT DOCUMENTS

| | | | | |
|---|---|---|---|---|
| 4,677,553 A * | 6/1987 | Roberts et al. ................ 463/17 |
| 4,725,079 A * | 2/1988 | Koza et al. .................... 283/73 |
| 5,286,061 A | 2/1994 | Behm .......................... 283/95 |
| 5,601,887 A | 2/1997 | Rich et al. .................... 428/29 |
| 5,752,152 A | 5/1998 | Gasper et al. ................ 399/366 |
| 5,803,504 A * | 9/1998 | Deshiens et al. .............. 283/67 |
| 6,097,497 A | 8/2000 | McGraw ..................... 358/1.12 |
| 6,155,491 A | 12/2000 | Dueker et al. ................ 235/486 |
| 6,325,420 B1 | 12/2001 | Zhang et al. .................. 283/70 |
| 6,330,685 B1 | 12/2001 | Hao et al. ...................... 714/1 |
| 6,354,630 B1 | 3/2002 | Zhang et al. .................. 283/70 |
| 6,379,742 B1 | 4/2002 | Behm et al. .................... 427/7 |
| 6,405,929 B1 | 6/2002 | Ehrhart et al. ............... 235/486 |
| 6,493,597 B1 | 12/2002 | Linares et al. ................ 700/83 |
| 6,650,946 B2 | 11/2003 | Bauer ......................... 700/23 |
| 6,694,043 B2 | 2/2004 | Seder et al. ................. 382/100 |
| 6,733,194 B2 | 5/2004 | Schilling et al. ........ 400/120.01 |
| 6,739,245 B2 | 5/2004 | Schilling et al. .............. 101/91 |
| 6,768,558 B1 * | 7/2004 | Yamashita et al. .......... 358/1.18 |
| 2003/0193684 A1 * | 10/2003 | Kendall et al. ............. 358/1.14 |
| 2004/0061326 A1 | 4/2004 | Hilton et al. .................. 283/72 |
| 2008/0013848 A1 * | 1/2008 | Wu et al. .................... 382/254 |

* cited by examiner

*Primary Examiner*—Leslie J Evanisko
(74) *Attorney, Agent, or Firm*—Dority & Manning, P.A.

(57) ABSTRACT

A print monitoring system comprising a printer that generates a printed object that comprises a) a printed area located on a substrate, the printed area having a predetermined width and defining a two-dimensional matrix having a plurality of rows and a plurality of columns; b) print indicia printed on the substrate within the two-dimensional matrix of said printed area such that at least one row of the plurality of rows contains print indicia that are separated by a maximum width; and c) at least one print validation symbol printed on the substrate in a predetermined first validation print area. The system can also comprise an image capture device configured to read at least the at least one validation symbol and a controller in communication with the image capture device that compares the at least one validation symbol to a predetermined at least one validation symbol and makes quality control decisions based on the comparison.

17 Claims, 6 Drawing Sheets

PRINT MONITORING SYSTEM AND METHOD

FIELD OF THE INVENTION

The present invention is directed to a print monitoring system for inspection of a printed object, more particularly to a print monitoring system for inspection of printed game tickets.

BACKGROUND

Conventional print monitoring systems are commonly used to monitor printed matter in some types of paper/sheet handling systems and to make certain control decisions based upon the character of the printed matter. Print monitoring systems can detect the precision with which the printing system has formed the printed matter and/or the consistency with which the matter is printed across the paper. For example, in a laser printing system, the monitoring system detects low-toner situations where the contrast of the printed matter has degraded unacceptably.

The inclusion of explicit control information on the printed matter is many times unacceptable. Typical printed objects do not include machine readable information a predictable locations to enable the print monitoring system to ensure the quality of the overall print on the printed object.

Attempts have been made at placing non-intrusive information onto printed matter. Glyph codes are one example. Information is typically encoded into glyph codes by modulating the orientation of optically detectable symbols or glyphs. Using such techniques, large amount of information is encoded into printed images for copy control. Generally, however, glyph codes are not appropriate for print monitoring. The glyphs can be placed into images that may not be present on each printed object and that may not reside at the same location on each printed object. Therefore, conventional image capture devices that monitor for glyph-based symbols must process the entire area of the printed matter, increasing the expense in both the image capture device and the processing capability required in the print monitoring system.

Typical print monitoring systems are used for digit control and sequence control. Such systems do not provide a methodology for continually monitoring the print quality of each individual printed object and identifying errors in print quality. If the printed object is a game ticket in which a portion of the print is covered in a subsequent processing step, it is desired that any printing error be identified during the printing process so that the particular ticket or tickets can be specifically identified prior to being sent to the ticket distributors.

SUMMARY

In general, according to one aspect, the invention concerns printed matter. The printed object has printed information context that is printed onto a substrate. The printed information context is relevant to the intended reviewer, e.g., the printed text of the letter or game ticket and is printed within a printed area of the substrate. The printed area has a predetermined width and defines a two-dimensional matrix having a plurality of rows and a plurality of columns. The printed matter includes print indicia forming the printed information context that is printed on the substrate within the matrix of the printed area such that at least one row of the plurality of rows contains print indicia that are separated by a maximum width. Further, the printed matter also comprises at least one print validation symbol that is printed on the substrate in a predetermined first validation print area. The first print validation symbol can be separated from the print indicia, or in an alternative aspect can be printed within the printed area of the substrate.

The present system is directed to both an intrusive and/or a non-intrusive print monitoring system. The system is intrusive in one sense in that the print validation symbol may be readily detectable upon inspection. Alternatively, the system is non-intrusive in the sense that the print validation symbol is detectable upon close inspection, but is not apparent to the intended viewer of the printed object.

The print validation symbol can be localized in the printed object so that the size of the image capture device required for detection and the amount of data that must be handled by the computer resources is limited. Moreover, in an alternative embodiment, the print validation symbol can be located in substantially the same location even between different printing runs of different printed matter. This feature can lower or eliminate the time required to recalibrate the image capture device's position relative to the printed object.

In another aspect, the printed object may also comprise a second validation print area on the substrate that has a predetermined area, which is substantially blank. In one example, the first and second validation print areas are co-located such that a portion of the second validation print area includes the print validations symbols printed thereon.

In order to minimize the visual impact on the printed object, the first validation print area, its associated print validation symbols, and the second validation print are as small as possible with imaging and data processing capability (based on the speed of the printing process) being the limitation on the size of the print validation symbol. For example, as the printing process is sped up, the relative size of the print validation symbols increases as well as the relative size of both the first and second validation print areas.

In another aspect, the system may comprise a printer that generates printed objects or matter that includes print indicia and the at least one print validation symbol. The system may also comprise an image capture device and a controller. In one aspect, the image capture device reads the at least one print validation symbol printed on the substrate of the printed object and the controller compares the at least one validation symbol to a predetermined at least one validation symbol and makes quality control decisions based on the comparison.

DETAILED DESCRIPTION OF THE FIGURES

The figures are not necessarily to scale, emphasis instead being placed upon illustrating the principles of the invention. These and other features of the preferred embodiments of the invention will become more apparent in the following detailed description in which reference is made to the appended figures wherein.

DETAILED DESCRIPTION OF THE INVENTION

The present invention is more particularly described in the following examples that are intended as illustrative only since numerous modifications and variations therein will be apparent to those skilled in the art. Thus the embodiments of this invention described and illustrated herein are not intended to be exhaustive or to limit the invention to the precise form disclosed. They are chosen to describe or to best explain the principles of the invention and its application and practical use to thereby enable others skilled in the art to best utilize the invention. As used in the specification and in the claims, "a," "an," and "the" can mean one or more, depending upon the context in which it is used. The preferred embodiment is now described with reference to the figures, in which like numbers indicate like parts throughout the figures.

Figure 1:
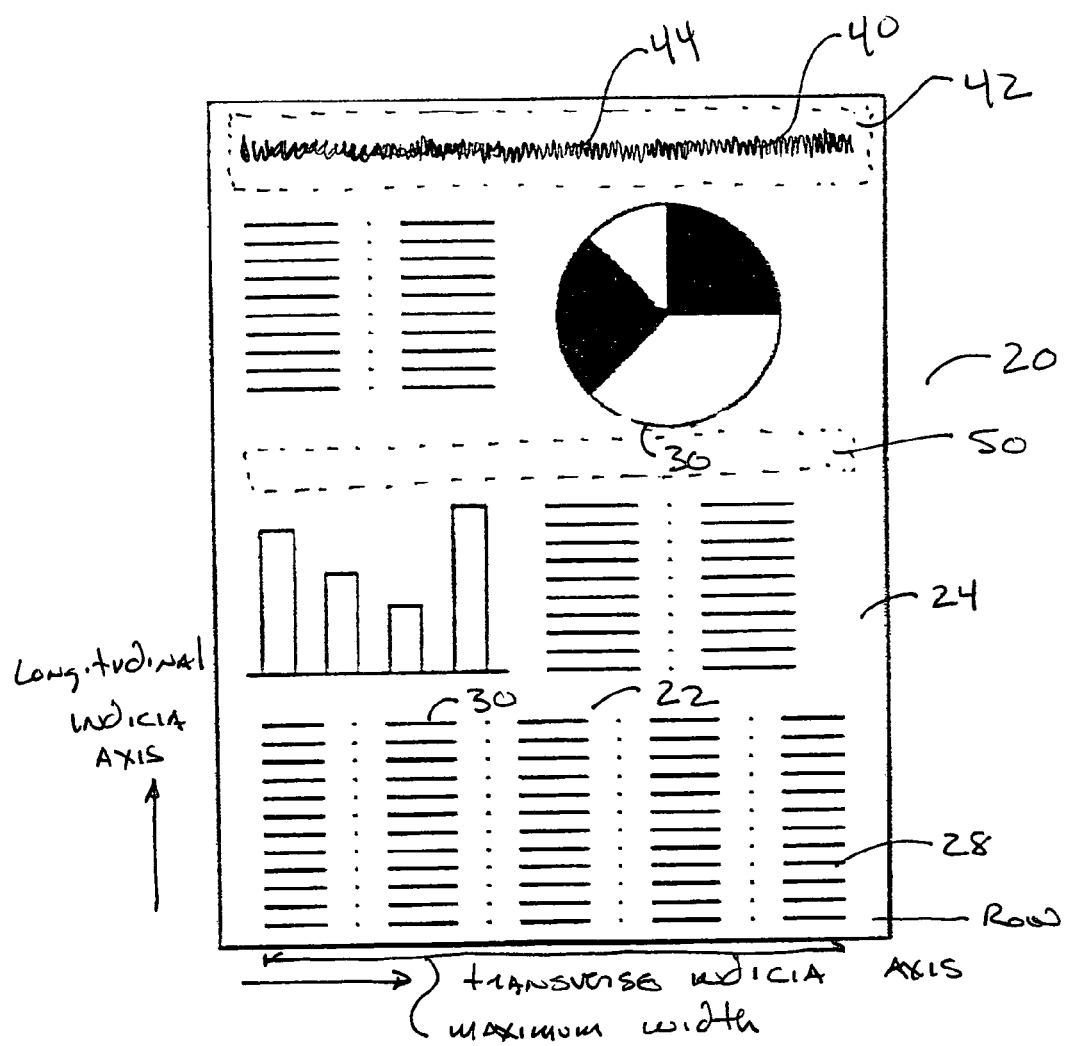
FIG. 1 is an exemplary printed object of the present invention having a printed area located on a substrate, showing at least one print validation symbol printed on the substrate in a predetermined first validation area, and showing a second validation area.
Figure 2:
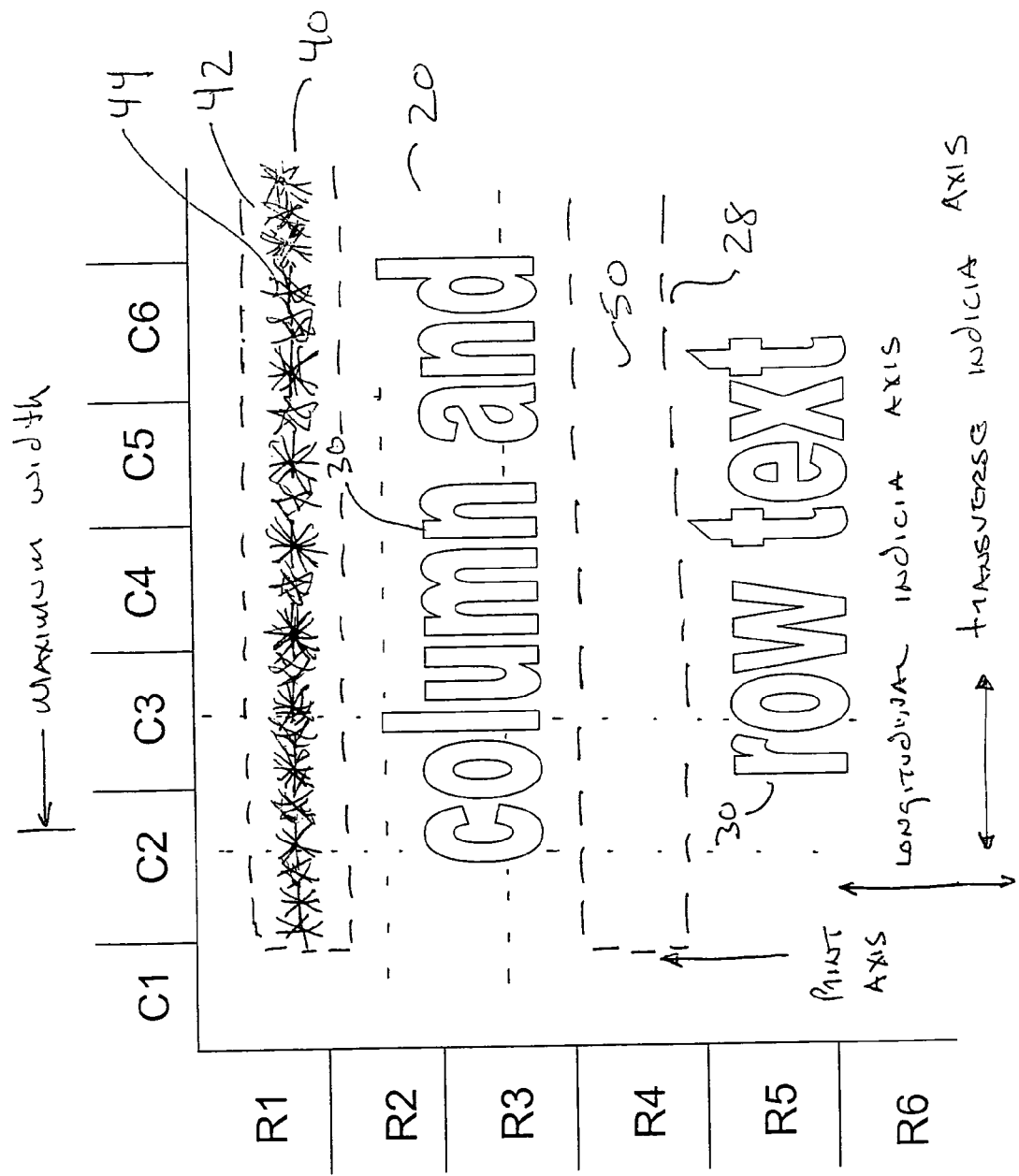
FIG. 2 is an exemplary printed object of the present invention having a printed area located on a substrate, the printed area defining a two-dimensional matrix having a plurality of rows and a plurality of columns, the figures showing at least one print validation symbol printed on the substrate in a predetermined first validation area, and showing a second validation area.
Figure 3:
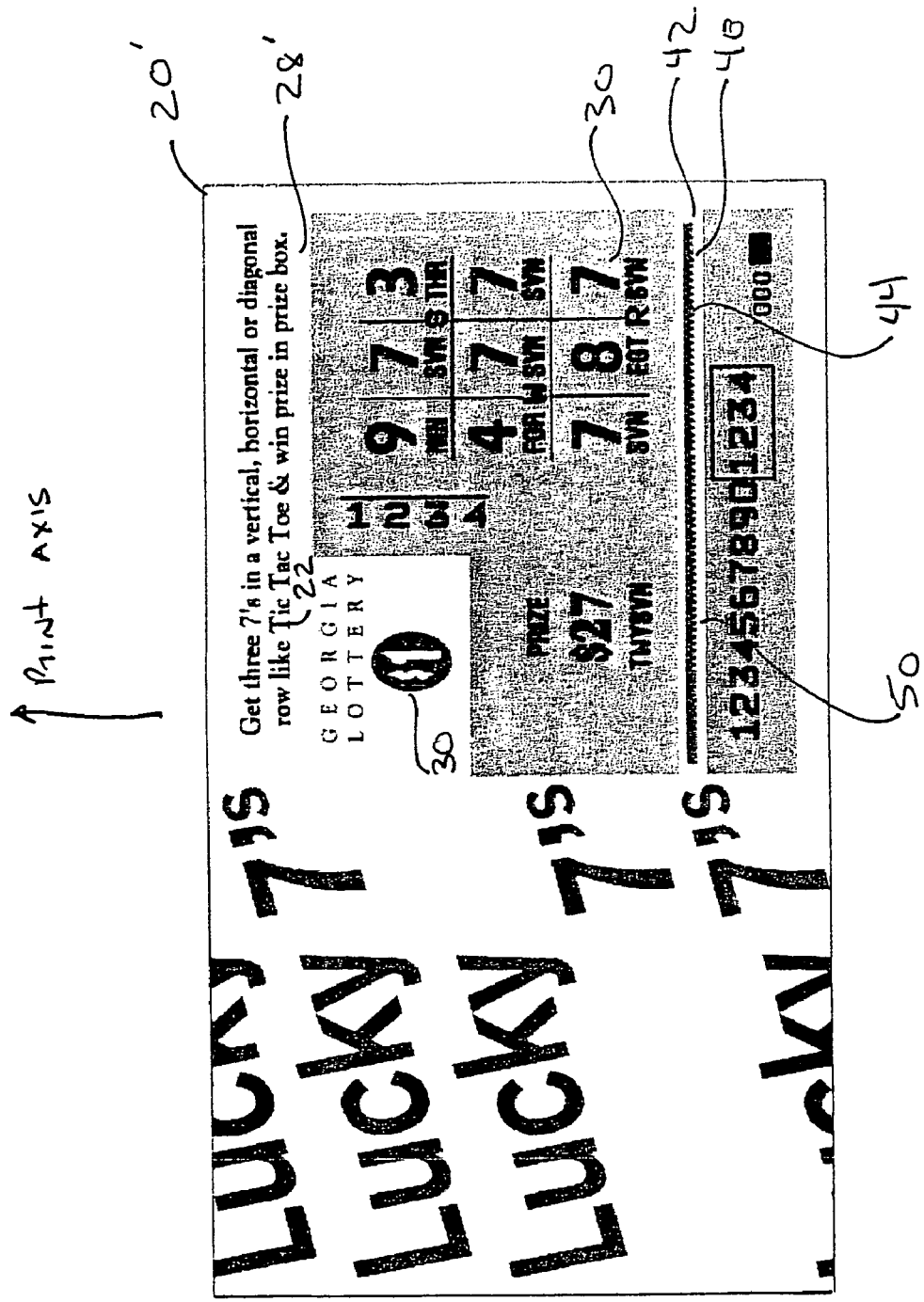
FIG. 3 is an exemplary printed game ticket of the present invention having a printed play area located on a substrate, showing at least one print validation symbol printed on the substrate in a predetermined first validation area, and showing a second validation area.

FIGS. 1-3 show exemplary printed objects 20 that are configured according to the principles of the present invention. Specifically, the printed object 20 has printed informational context 22 that is printed onto a substrate 24 of the printed object. Typically, the printed information context comprises text or image content that is located on the substrate as customary or desired. The printed information context 22 is relevant to the intended reviewer and is printed within a printed area 28 of the substrate 24.

A game ticket 20' having a longitudinal axis is an example of a suitable printed object 20 for the print monitoring system 10 of the present invention. It is desirable to determine it there are any printing defects on a game ticket 20' prior to the ticket being delivered to a third party ticket dispersing agent. If the printed object is a game ticket 20' or lottery ticket, the printed information context 22 is printed within a printed play area 28' of the substrate. For the purpose of this disclosure, the "printed area 28" and "printed play area 28'" are used synonymously.

The printed area 28 has a predetermined width and defines a two-dimensional matrix that has a longitudinal indicia axis that extends substantially parallel to the longitudinal print axis of the printed object and a transverse indicia axis that extends substantially transverse to the longitudinal print axis of the printed object. The longitudinal print axis of the printed object is substantially parallel to the direction of travel of the printed object during the printing process. The printed area 28 contains print indicia 30 that can be spaced along the transverse indicia axis a maximum width. In one aspect, the two-dimensional matrix of the printed area defines a plurality of rows and a plurality of columns. In this aspect, the print indicia 30 is printed on the substrate 24 within the printed area 28 such that at least one row of the plurality of rows contains print indicia that are separated by the maximum width.

The printed object 20 also comprises at least one print validation symbol 40 that is printed on the substrate of the printed object in a predetermined first validation print area 42. In one aspect, the at least one print validation symbol 40 and the print indicia 30 are printed onto the substrate 24 generally simultaneously. The at least one print validation symbol 40 and the print indicia 30 can be applied onto the substrate via conventional printing techniques and apparatus. Examples of techniques useful for applying print onto the substrate include, but are not limited to, flexography, roto gravure, screen printing, offset printing, letter press or roll coater.

The print monitoring system 10 of the present invention can be directed to both an intrusive and/or a non-intrusive print monitoring system. The system is intrusive in one sense in that the print validation symbol can be readily detectable upon inspection. Alternatively, the system is non-intrusive in the sense that the print validation symbol is detectable upon close inspection, but is not apparent to the intended viewer of the printed object.

The print validation symbol 40 can be spaced from the print indicia 30 disposed in the print area 28, or in an alternative aspect, can be printed within the printed area 28 of the substrate. That is, the first validation print area 42 can be located within, or, alternatively, be spaced from the print area 28 of the printed object.

In one aspect, the at least one print validation symbol comprises an array of print validation symbols 44. In an alternative aspect, the array of print validation symbols 44 extends generally linearly. In a further aspect, the at least one print validation symbol 40 has a predetermined size and shape. In one aspect, the at least one print validation symbol 40 extends at least about the maximum width of the print indicia 30. In another aspect, the at least one print validation symbol 40 is printed on the first validation print area 42 such that at least one print validation symbol is substantially co-axial with a portion of each column of the matrix of the printed area.

In another aspect, the printed object 20 may also comprise a second validation print area 50 on the substrate 24 that has a predetermined area that is substantially blank. In one example, the second validation print area 50 has a width that is at least about the maximum width of the print indicia. The second print validation area 50 can be spaced from the print indicia 30 disposed in the print area 28, or in an alternative aspect, can be located within the printed area of the substrate. That is, the second validation print area 50 can be located within, or, alternatively, be spaced from the print area 28 of the printed object. In another aspect, at least a portion of the first validation print area 42 and at least a portion of the second validation print area 50 can be co-located. It is contemplated that the first and second validation print areas can be co-located. In the co-located examples, the second validation print area 50 provides a minimum clear space buffer that separates the print validation symbol 40 from any of the printed information context 22. This allows the print monitoring system 10 to quickly and clearly distinguish the print) validation symbol 40 from the printed information context.

The print validation symbol 40 can be localized in the printed object so that the size of an image capture device required for detection and the amount of data that must be handled by the computer resources is limited. Moreover, in an alternative embodiment, the print validation symbol can be located in substantially the same location even between different printing runs of different printed matter. This feature can lower or eliminate the time required to recalibrate the image capture device's position relative to the printed object.

Figure 4:
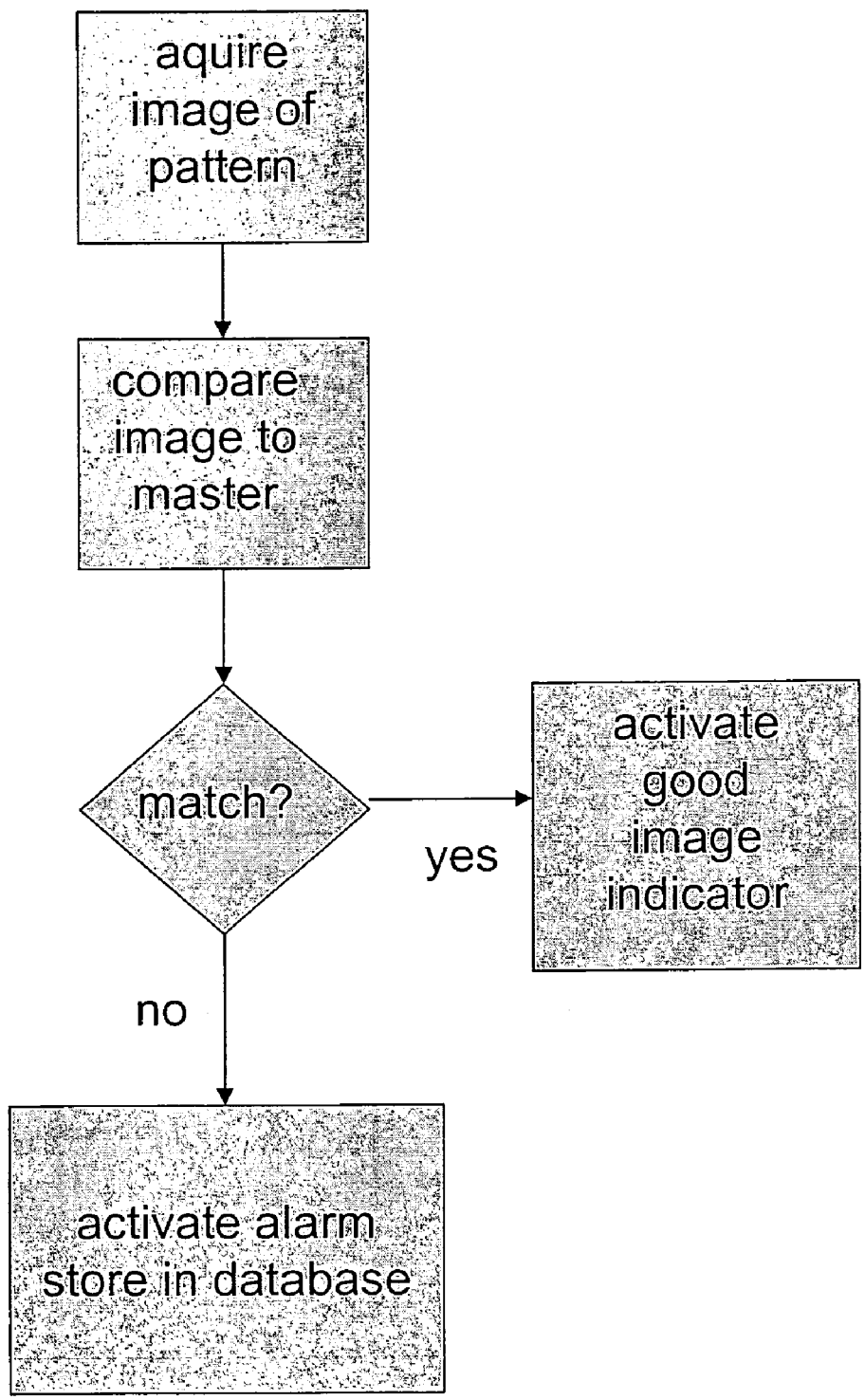
FIG. 4 is flowchart showing an exemplary process of monitoring the output of a printer.
Figure 5:
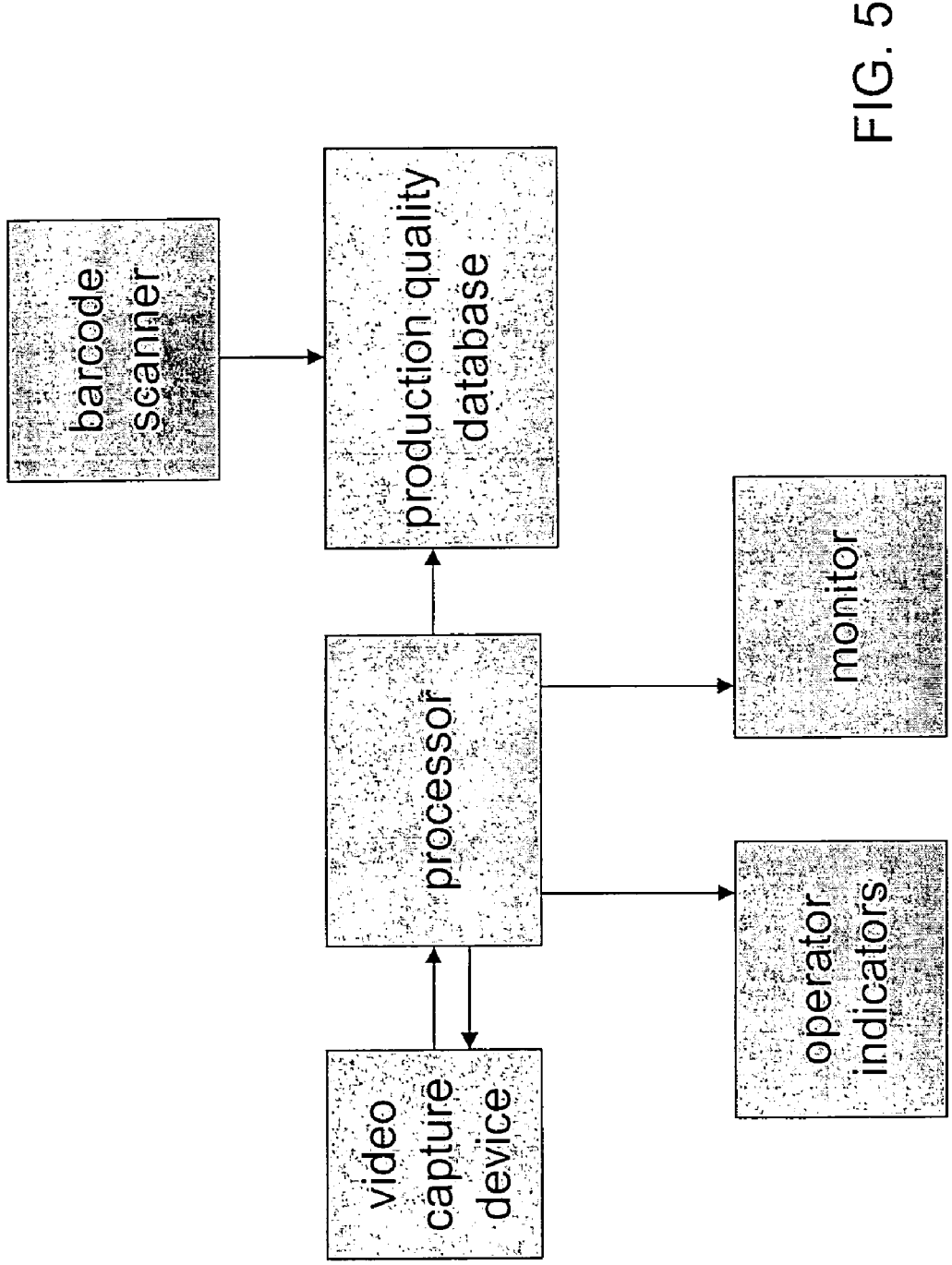
FIG. 5 shows a schematic diagram of an exemplary print monitoring system of the present invention.
Figure 6:
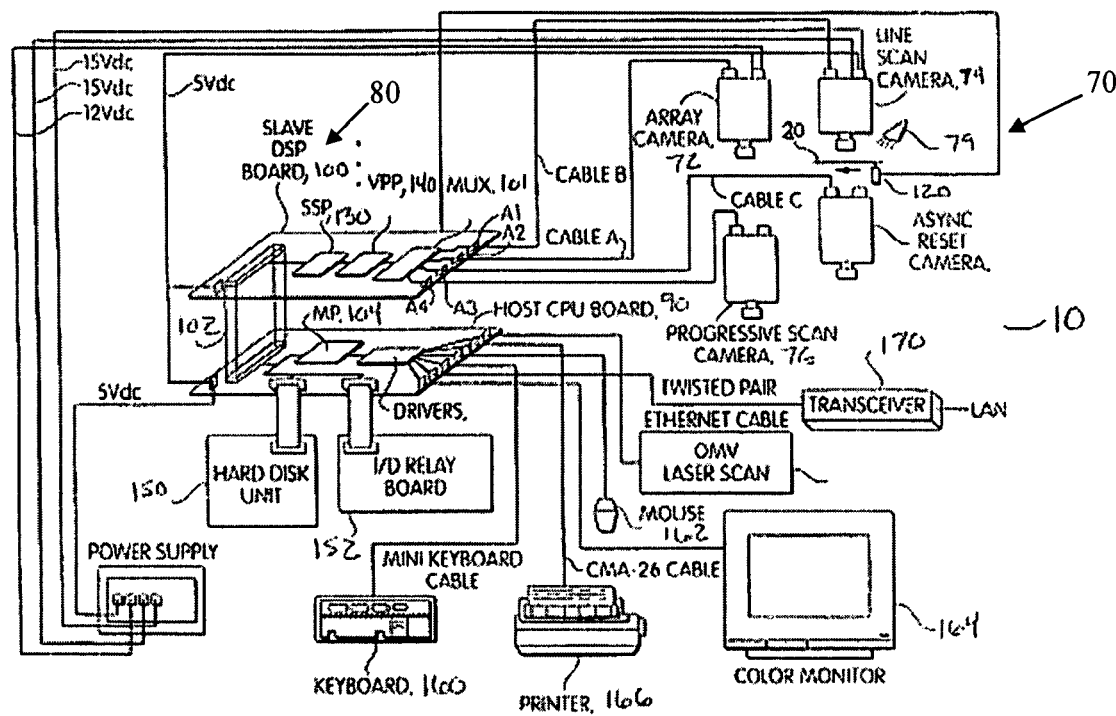
FIG. 6 shows a schematic diagram of an exemplary print monitoring system of the present invention

Referring now to FIGS. 4-6, the print monitoring system 10 of the present invention can comprise at least one printer 166, an image capture device 70, and a controller 80. In one aspect, each printer 166 generates a stream of printed objects 20 as described above. In one embodiment, all of the printed objects 20 in the generated print stream have been imprinted with the print validation symbol 40. In one aspect, the image capture device 70 reads the at least one print validation symbol printed on the substrate of the printed object and the controller 80 compares the at least one validation symbol to a predetermined at least one validation symbol and makes quality control decisions based on the comparison. In another aspect, the image capture device 70 is configured to read the second print validation area 50 and the controller 80 determines if there are any unwanted printed markings in the substantially blank second print validation area and makes quality control decisions based on the comparison.

In one aspect, the print monitoring system 10 of the present invention compares, simultaneously and/or on a real-time basis, the presence of a printed inspection pattern, e.g., the at least one validation symbol 40, to a stored image of the expected inspection pattern, e.g., the predetermined at least one validation symbol. The stored image of the inspection pattern is saved at the initial set up of the job such that all of the attributes of the exact pattern in question are recorded in memory. The image comparison process which occurs in the controller 80 makes a comparison of the acquired image to the saved image on a per pixel basis. In another aspect, the print monitoring system evaluates attributes the presence of the printed inspection pattern against fixed measurements rather than comparing the printed inspection patter to the predetermined at least one validation symbol. The fixed measurements of the inspection pattern is saved at the initial set up of the job such that all of the measurement attributes of the exact pattern in question are recorded in memory.

In terms of typical imaging errors, the print monitoring system 10 of the present invention can detect, for example, charge plate opens, charge plate shorts, crooked jets, streakers, lateral image shifts and/or other "typical" ink jet imaging errors as a result of the continuous comparison of the imaged inspection pattern to the saved master pattern.

In one aspect, a charge plate open typically is a condition in which a charge lead is open and therefore will not conduct and therefore will not deflect ink from that particular orifice. In this condition, the affected orifice would print continuously. The print monitoring system of the present invention will detect this condition as the presence of unwanted print in the second print validation area.

In one aspect, a charge plate short is a condition which occurs when an ink jet charge plate lead is shorted on another ink jet charge plate lead, which causes two orifices to print simultaneously. This can be a difficult condition to detect as it only occurs when the charge leads in question are activated or deactivated. The print monitoring system of the present invention will detect this condition by detecting unexpected print from the orifice either in the second print validation area or as an excessive amount of ink in the print validation symbol.

In one aspect, a streaker can be a result of a number of electronic problems within the ink jet system but typically is manifested in a continually printing orifice. This causes a continuous streak of ink on the print substrate. The print monitoring system of the present invention will detect this condition by detecting unexpected print from the orifice in the second print validation area.

In another aspect, one or more print heads can become miss-registered or out of the desired position with respect to the other fixed printing on the substrate. The print monitoring system of the present invention will detect this condition by detecting unexpected print from the orifice in either print validation area.

In one aspect, a crooked jet condition, which can be caused by a specific ink jet orifice is blocked, work, and/or defective, results in a ink stream exiting that orifice at an angle and not substantially straight and parallel to the other streams of ink from adjacent orifices. Typically, this condition is exhibited on the substrate as unexpected ink dots or a line of ink dots. The print monitoring system of the present invention will detect this condition by detecting unexpected print from the orifice either in the second print validation area or by detecting a change in the detected print validation symbol within the first print validation area relative to the stored image of the expected inspection pattern, e.g., the predetermined at least one validation symbol.

In another aspect, the print monitoring system 10 of the present invention evaluates the second print validation area 50 that is expected to be void of any print for the presence of unwanted print. In this aspect, the print monitoring system 10 compares, simultaneously and/or on a real-time basis, the acquired image to a saved master image with the expectation that any evident print or marking in the second print validation area 50 is the result of a print error. Printing errors that could result in a failure of this case include, for example, streakers, miss-registered print, either variable or static, or satellites, and/or other erratic variable print.

In order to minimize the visual impact on the printed object 20, the first validation print area 42, its associated print validation symbols 40, and the second validation print area 50 are as small as possible with imaging and data processing capability (based on the speed of the printing process) being the limitation on the size of the print validation symbol 40. Thus, the minimum size of the print validation symbol is dependent upon the speed of the printing process. For example, as the printing process is sped up, the relative size of the print validation symbols 40 increases as well as the relative size of both the first and second validation print areas 42, 50. In one aspect, the at least one print validation symbol 40 has a predetermined height that is sufficient to reach a threshold of visibility for the image capture device 70.

In one example of the print monitoring system 10, each individual printed object 20 is individually recognized by the print monitoring system via sequencing information that correlates the printed object 20 from each printer. For example, a barcode scanner system can be positioned to acquire a barcode from each printed object in synchronization with the print monitoring system and to thereby identify particular ticket information.

In one example, the print streams pass through the print monitoring system, which detects the print validation symbols 40 in the first print validation area 42 and detects the second print validation area 50, if used. The print monitoring system 10 then uses the information gained from analysis of the print validation symbols 40 and the second print validation area 52, if used, to identify individual printed objects, or batches of printed objects, that have printing errors. The system 10 stores the data that identifies printed objects that have a printed error thereon the imprintable substrates and can display the data to an operator. This information can be communicated downstream so that the flawed printed objects 20 can be removed prior to a subsequent downstream process such as, for example, packaging.

In one aspect, the print monitoring system 10 reviews sequential printed objects 20 to determine if any discovered printing error is isolated to a small number of tickets, is periodically recurrent, or is substantially continual. The print monitoring system 10 can provide guidance as to whether a particular printer and its associated print stream should be shut down to affect maintenance on the printer.

An image capture device 70 and controller 80, which can be used in the practice of the print monitoring system 10 of the present invention, can be purchased from Inspectron. An illustrative example of such an image capture device and controller is disclosed in U.S. Pat. No. 6,493,597 to Linares, et al., entitled Print Monitoring System and Method Using Slave Signal Processor Arrangement, which issued Dec. 10, 2002, the contents of which are incorporated herein in their entirety by this reference. It will be appreciated that the image capture device can comprise, for example, a shuttered camera, a line scan camera, and the like.

In one embodiment, the controller 80 can have at least one slave processor (DSP) 100 operatively coupled to a one central processor unit (CPU) 90. In one aspect, each slave processor board 100 has at least one video input port, such as, for example, A1, A2, A3, A4. Each video signal port has the capability to support its own image capture device 70. As illustrated, potential image capture devices 70 include array cameras 72, line camera 74, progressive scan cameras 76, and asynchronous reset cameras 78.

In order to time image acquisitions by the image capture devices, a trigger device 120 is used to detect the movement of the printed object 20. The trigger device 120 takes a number of different configurations depending on the application and the event to be detected. In one example, it detects the beginning of a sheet of paper using an optical or probe sensor. The signal processor 130 then times a delay until the print validation symbols 40 and/or the second validation print area 50 are under the camera before signaling the beginning of an image capture event. In other cases, the trigger device 120 is used to detect print validation symbols 40 on the printed object 20 at predetermined intervals or movements of the paper handling equipment using optical or mechanical encoders, for example.

On the slave board 100, an analog multiplexer 101 can be used to select the video signal from one of the video input ports. The selected video signal is presented to a video preprocessor 140 that converts the video signal into a form that is capable of being sampled at a digital signal port of a digital signal processor 130. Specifically, the video preprocessor 140 low pass filters the video signal to compensate for any uneven illumination at the video capture device 72, 74, 76, 78 by printed object illuminator 79 and level adjusts the video signal by thresholding it to a signal level appropriate for receipt at the signal processor's digital signal port.

The signal processor 130 identifies the target print validation symbols 40 and/or the second print validation area 50 in the captured video signal by reference to the predetermined position for the print validation symbols 40 and/or the second validation print area 50.

Additional slave DSP boards 100 can be attached to the ISA bus 102. For example, in one exemplary implementation, up to four separate slave DSP boards 100 are connected to the host central processing unit (CPU) board 90 via extensions to the bus 102 to monitor coordinate and sequence multiple streams of printed objects 20.

In an exemplary embodiment, the master processor 104 is an Intel-brand industrial-grade CPU. It connects to a hard disk unit 150, input/output (I/O) relay board 152, and memory via bus 102. In one aspect, through its drivers 154, it receives user commands from an operator input device, such as, for example, a keyboard 160 and/or a mouse 162. It can present data to the operator via color monitor 164 and printer 166. The monitor 164 can have a touch screen to enable operator control without the necessity for the keyboard 160 and mouse 162. The print monitoring system 10 can also have a network interface card (NIC) 170 that connects the CPU board 90 to a local area network (LAN) in order to enable remote control, monitoring, and data logging.

In a further aspect, the print monitoring system can also merge image quality data that is supplied by the image capture device with other printed quality attributes of the printed object to create a production quality database on a real time basis. As one will appreciate, the operator of the system may be notified of error indications or conditions by channel of the imaged printed object or as configured by the operator.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A print monitoring system, comprising:
   a. a printer that generates a printed object, the printed object comprising:
      i. substrate adapted to be printed thereon;
      ii. a printed area located on said substrate, the printed area having a predetermined width, the printed area further defining a two-dimensional matrix having a plurality of rows and a plurality of columns;
      iii. print indicia printed on said substrate within the two-dimensional matrix of said printed area such that at least one row of the plurality of rows contains print indicia that can be spaced along a transverse axis of said substrate to a maximum width; and
      iv. at least one print validation symbol printed on said substrate in a predetermined first validation print area, wherein the at least one print validation symbol extends at least about the maximum width of the print indicia, and wherein the at least one print validation symbol is printed on the first validation print area such that the at least one print validation symbol is substantially co-axial with a portion of each column of the plurality of columns;
   b. an image capture device configured to read at least the at least one validation symbol; and
   c. a controller in communication with the image capture device that compares the at least one validation symbol to a predetermined at least one validation symbol and makes quality control decisions based on the comparison.

2. The print monitoring system of claim 1, wherein the printed object further comprises a second validation print area on said substrate that has a predetermined area that is substantially blank, wherein the image capture device is configured to read the second validation print area, and wherein the controller determines if there are print markings in the second validation print area.

3. The print monitoring system of claim 2, wherein the first and second validation print areas are co-located.

4. The print monitoring system of claim 2, wherein at least a portion of the second validation print area is within the printed area of the substrate.

5. The print monitoring system of claim 2, wherein the second validation print area has a width at least about the maximum width of the print indicia.

6. The print monitoring system of claim 2, wherein the printed object is a lottery ticket.

7. The print monitoring system of claim 1, wherein at least a portion of the first validation print area is within the printed area of the substrate.

8. The print monitoring system of claim 1, wherein the at least one print validation symbol has a predetermined height sufficient to reach a threshold of visibility for the image capture device.

9. A method of monitoring the output of a printer, comprising:
   printing, on an imprintable substrate, quality control information in a manner detectable by a print monitoring system, the imprintable substrate having a printed area having a predetermined width and defining a two-dimensional matrix having a plurality of rows and a plurality of columns, print indicia being printed on the substrate within the two-dimensional matrix such that at least one row of the plurality of rows contains print indicia that can be spaced along a transverse axis of said substitute to a maximum width;
   defining a first validation print area on said substrate;
   printing at least one validation symbol in the first validation print area so that said validation symbol extends at least about the maximum width of the print indicia; capturing an image of the at least one validation symbol with the print monitoring system; and analyzing the image to indicate the quality of the print indicia printed on the substrate with the print monitoring system.

10. The method of claim 9, further comprising defining a second validation print area on the substrate that has a predetermined area that is substantially blank.

11. The method of claim 10, wherein the second validation print area has a width at least about the maximum width of the print indicia.

12. The method of claim 10, wherein the first and second validation print areas are substantially co-located.

13. The method of claim 10, further comprising capturing an image of the second validation print area and determining if there are markings in the second validation print area.

14. The method of claim 13, further comprising identifying imprintable substrates in which a printing error is detected in the first validation print area.

15. The method of claim 14, further comprising identifying imprintable substrates in which a printing error is detected in the second validation print area.

16. The method of claim 15, further comprising storing data that identifies imprintable substrates having a printing error.

17. The method of claim 15, further comprising displaying data to an operator that identifies imprintable substrates having a printed error.

* * * * *